(12) United States Patent
Thompson et al.

(10) Patent No.: US 10,123,294 B2
(45) Date of Patent: Nov. 6, 2018

(54) MEDIA ACCESS CONTROL METHOD WITH TIME-COHERENCE AND DETERMINISTIC SCHEDULING FOR WIRELESS COMMUNICATIONS NETWORK

(71) Applicant: Southwest Research Institute, San Antonio, TX (US)

(72) Inventors: Travis R. Thompson, San Antonio, TX (US); Michael S. Moore, San Antonio, TX (US); Kase J. Saylor, San Antonio, TX (US); Patrick R. Heenan, Boulder, CO (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 121 days.

(21) Appl. No.: 15/097,519

(22) Filed: Apr. 13, 2016

(65) Prior Publication Data

US 2017/0303223 A1 Oct. 19, 2017

(51) Int. Cl.
*H04W 56/00* (2009.01)
*H04W 76/20* (2018.01)
*H04J 3/06* (2006.01)
*H04W 76/27* (2018.01)

(52) U.S. Cl.
CPC ......... *H04W 56/004* (2013.01); *H04J 3/0638* (2013.01); *H04W 56/002* (2013.01); *H04W 76/27* (2018.02)

(58) Field of Classification Search
CPC ............ H04W 56/004; H04W 56/002; H04W 76/046; H04W 52/02; H04W 52/2016; H04W 52/0219; H04W 52/0222; H04W 52/0248; H04W 56/001; H04W 56/0025; H04W 56/003; H04W 56/0035; H04W 56/0045; H04W 56/005; H04W 56/0055; H04W 56/006; H04W 56/007; H04W 56/0075; H04J 3/06–3/0697; G06F 1/04–1/14; Y02B 60/40; Y02B 60/50
See application file for complete search history.

(56) References Cited

U.S. PATENT DOCUMENTS 6,324,406 B1 *  11/2001  Zadeh .................. H04W 64/00
                                                    370/332
2005/0141565 A1 *  6/2005  Forest ................... H03M 13/43
                                                    370/503

(Continued)

*Primary Examiner* — Maharishi V Khirodhar
*Assistant Examiner* — Kenneth P Hunt
(74) *Attorney, Agent, or Firm* — Livingston Law Firm

(57) ABSTRACT

A method of synchronizing the transmission and receipt of messages by radios within a wireless communications network. It is assumed that the radios have chip scale atomic clocks, which are externally synchronized, such as by GPS, but only at the beginning of a mission. Each radio defaults to a sleep mode, in which its receive and transmit circuitry is inactive. Each radio stores a channel plan of pre-determined base transmit times, and calculates a worst case time drift between clocks and a propagation delay value between combinations of radios. At each base transmit time, if a radio has an outgoing message to transmit, it subtracts propagation delay from the base transmit time, and transmits only at that time. Also, for each base transmit time, each radio subtracts time drift, thereby determining a receive time window during which it listens for messages from other radios.

16 Claims, 2 Drawing Sheets

(56) References Cited

U.S. PATENT DOCUMENTS

2008/0108354 A1* 5/2008 Nagata .................. H04W 36/02
    455/438
2011/0153869 A1* 6/2011 Bryant .................. H04J 3/0664
    709/248
2011/0249688 A1* 10/2011 Liu ..................... H04W 56/002
    370/503
2013/0272180 A1* 10/2013 Hiremath ............ H04W 52/028
    370/311

* cited by examiner

MEDIA ACCESS CONTROL METHOD WITH TIME-COHERENCE AND DETERMINISTIC SCHEDULING FOR WIRELESS COMMUNICATIONS NETWORK

TECHNICAL FIELD OF THE INVENTION

This invention relates to wireless communications systems, and more particularly to a media access control method that uses highly stable clocks for time coherence and uses a scheduling algorithm to pre-plan transmission times.

BACKGROUND OF THE INVENTION

Technological advances have made possible wireless communication devices that are small, inexpensive and energy efficient, thus increasing their portability and convenience. Many applications, such as two-way radios, cellular phones, wi-fi, sensor networks, and others, use networks of mobile, often hand-held, wireless communications devices (referred to herein generically as network "radios" or "nodes").

A common requirement of most wireless communication network applications is some level of time synchronization. The synchronization scheme can vary from lenient to strict. Various media access control (MAC) protocols have been developed that implement variations of time synchronization to achieve collision-free data transfers among the radios.

One challenge for synchronization methods in wireless networks is energy conservation. Another challenge is accommodation of additions, failures, and absences of nodes of the network. Additionally, the synchronization method must be secure against attack.

In the past, the on-board clocks used to achieve time synchronized media access have had a relatively large footprint, have been expensive, and consume significant power. The advent of the chip scale atomic clock (CSAC) has resulted in the potential for highly stable clocks with lower size, weight, power, and cost requirements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Overview

Figure 1:
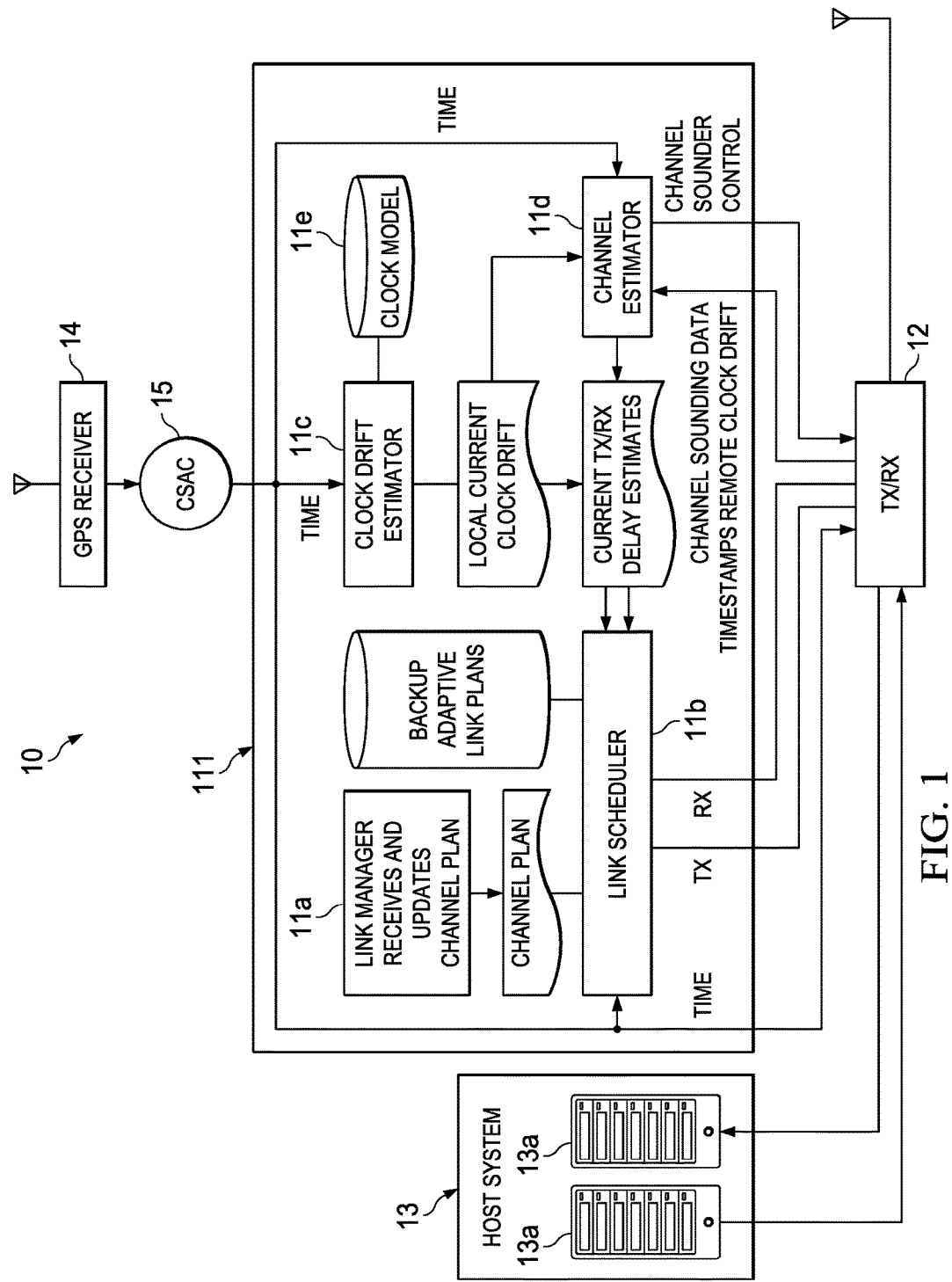
FIG. 1 illustrates a radio within a network of radios, and having a MAC control unit in accordance with the invention.

The following description is directed to a media access control method, used within a wireless data communications network. The method reduces the need for strict synchronization between the network nodes ("radios"), which reduces the amount of over-the-air energy transmitted. This in turn, reduces the power consumption of the radios, as well as the likelihood of interception or detection of the transmissions.

More specifically, the method provides each radio with an accurate sense of time and a common schedule of transmit opportunities. Each radio transmits its data communications signal in such a way that it will arrive at the receiving radio when expected. The radio waveforms are time-coherent, which means that they are not dependent on over-the-air transmission of synchronization signals. At appropriate times, the radio electronics can be powered off, further reducing the radio's energy needs.

For purposes of example, this description is written in terms of a two-way radio network, in which the radios are hand-held devices. However, as used herein, a "radio" is used in the most general sense to mean a wireless device that communicates by exchanging data with other wireless devices. Thus, in other embodiments, the "radio" may be some other type of device for some other wireless application. For example, two-way radio networks may use any combination of mobile, stationary base and hand-held radios. A mobile telephone or cellular telephone network is another example of a radio network, with today's telephone systems being highly complex and sophisticated. Other examples of wireless communications networks are sensor networks and wi-fi, having network nodes that include some sort of radio communications device.

It is assumed for purposes of this description that the wireless network is a packet-switched network. Units of specially formatted data called "packets" are routed through the network. Both control data and payload data are contained within each packet. The control data provides information for delivering the payload data, for example: source and destination network addresses, error detection codes, and sequencing and synchronization information.

Typically, any data communications system uses some sort of "media access control" (MAC) protocol. For example, in the IEEE 802 reference model of computer networking, the media access control (MAC) layer is a sublayer of a data link layer of a seven-layer model. A MAC protocol provides addressing and channel access control mechanisms that make it possible for network nodes to communicate within a multiple-access multiple-node network. The hardware that implements the MAC is referred to as a media access controller.

In general, the media access control method described herein may be used with any radio communications network that communicates using packets and calls for a media access control method.

The Synchronization Problem

As indicated in the Background, in wireless data communications, synchronization is a difficult problem. Conventionally, a data signal has "extra" energy (information) at the beginning of each packet, which allows receiving radios to determine whether the signal is present and where the data is located. In many synchronization schemes, the receiver must correlate incoming signal samples with an expected synchronization pattern until the pattern is recognized, which requires significant processing and power consumption. In some cases, dedicated synchronization packets are sent, which further increases the energy transmitted.

Synchronization processing may be done in hardware or software, but in either case, it increases the size, weight and power (SWaP) of the radio. Modern digital spread spectrum waveforms require many correlators, and thus extended synchronization signaling can have a large impact on SWaP.

Radio with MAC Control Unit

FIG. 1 illustrates a radio 10, having a media access control (MAC) unit 11 as described herein. The various other elements of radio 10 may vary depending on the communications system in which the radio is used. In other words, MAC unit 11 may be used with radios of varying complexity and applications.

In general, it is assumed that radio 10, in addition to MAC unit 11, will have an appropriate physical interface 12 for transmitting and receiving data (Tx and Rx) signals. This physical interface 12 includes the electronic transmitter and receiver hardware appropriate for wireless data communications, as well as hardware and software to implement whatever physical interface processing is appropriate for the particular application of radio 10.

In addition, MAC unit 11 will receive and deliver data to a host processor 13, which will implement whatever host layer processing is appropriate for the radio. Host processor 13 may include appropriate software and hardware for implementing applications programming as well as any encoding, compression, and encryption functions that may be desired. Host processor 13 typically has a user interface with appropriate hardware and software for providing user input and output. Data buffers 13a store payload data to and from the physical interface 12.

Radio 10 is further equipped with a highly stable clock, such as a chip scale atomic clock (CSAC) 15. CSAC 15 is assumed to be disciplined, as may be implemented with conventional clock disciplining methods such as by means of a GPS signal. An example of a suitable CSAC 15 is one having a 10 MHz frequency reference clock signal.

As explained below, the stability of CSAC 15 allows a network of radios 10 to operate with time coherence. The radios 10 share a common notion of time within a tight tolerance, based on the stability of their clocks and the time that has passed since they were disciplined. Models have been developed to characterize the worst-case time drift between CSACs, given the elapsed time since they were disciplined. Given such a model, the clocks can be considered "coherent" for some time after they have been synchronized.

MAC unit 11 executes a "randomized time domain media access control" method, referred to herein as the "MAC method". The MAC method reduces the amount of energy that must be sent over the air to synchronize between a set of inter-communicating radios 10. The method creates and encodes an a priori determined, randomized schedule of transmit opportunities.

The radios 10 share this schedule, and each radio uses the schedule to calculate transmit times and receiving time windows. More specifically, the MAC method exploits the time coherence between a set of CSAC-enabled radios 10, and adjusts the times at which the radios transmit energy and look for received energy in order to reduce the amount of time spent synchronizing between the radios.

The MAC unit 11 on the transmitting radio 10 estimates and compensates for the expected propagation delay and the worst-case clock drift between the transmitting and receiving radios. This allows it to determine the exact time at which energy should be transmitted. The MAC unit 11 on a receiving radio 10 determines the time range during which energy is expected, and only enables its receiver electronics (physical interface 12) during that time.

In cases when the transmit opportunity times can be made sparse, or when data is not transmitted constantly, the transmitter and receiver electronics (physical interface 12), which consume the most power, are put into a sleep mode. The net effects are: 1) the amount of energy that is transmitted to keep the radios synchronized is reduced, 2) energy consumption can be greatly reduced, 3) the radio waveform is more difficult to detect and to disrupt, and 4) the radios can operate independently of GPS timing signals.

The basic elements of MAC unit 11 are a link manager 11a, link scheduler 11b, a clock drift estimator 11c, and a channel estimator 11d. Each of these elements may be implemented with commercially available processing hardware, programmed to perform the tasks described herein.

Link Manager

As stated above, MAC unit 11 executes a deterministic, time-synchronized channel access algorithm that pre-plans potential transmission times. It arbitrates between radios 10 that are attempting to access the channel.

A mission is begun with synchronized CSACs 15. The link managers 11a of each radio 10 are provided with a pre-scheduled set of transmit opportunities (channel plan) a priori to the mission. Each link manager 11a receives and manages this channel plan, which is stored in memory of its radio.

The channel plan is based on an algorithm for determining the time of each transmit opportunity. This algorithm is shared between the radios 10 in the network, and results in a transmit pattern with random delays between transmission opportunities. During a transmit opportunity, if no radio has data to send, then the transmit opportunity is not used and energy is not transmitted.

The start of each transmission opportunity is determined a priori, through the combination of a shared seed and a random time delay generator. The random time delay generator may be expressed as:

$$T_n = T_{n-1} + \text{delay}(n, \text{seed}) \quad (1)$$

The delay function returns a base transmission time, $T_n$, between $\text{delay}_{min}$ and $\text{delay}_{max}$, which are configuration parameters specific to the mission.

The characteristics of the random delay are chosen based on the goals of the problem space. If the goal is to reduce the probability of detection and probability of intercept, then the probability density function (PDF) of the random delay generator is set as an even distribution so that the signal will be more randomized in the time domain. If the goal is instead to maximize the throughput by providing more transmit opportunities, the delay can be set to a small constant, or a random distribution of a mean close to $\text{delay}_{min}$. The PDF of the random delay function is a configuration item that can be programmed in the radio when configured for a particular use.

The MAC method supports both static and dynamic options for the allocation of transmit opportunities to radios 10.

In the static case, individual transmit opportunities are pre-associated with a particular radio in the network so that no over-the-air access control mechanism is needed.

In the dynamic case, the algorithm utilizes a simple over-the-air dynamic access scheme in which transmit opportunities include both an access frame and a data frame. A radio with data to send transmits a HAIL signal during its timeslot in the access frame, and listens for HAIL signals from other radios. If multiple radios are requesting the transmit opportunity, arbitration is handled by a scheduling algorithm that is executed on each radio to determine which radio is given access. The scheduling algorithm can be tailored for the mission. The algorithm that has been implemented allocates transmit opportunities to the radio with the highest "priority" at the time, with the priority being determined based on the index of the transmit opportunity. This creates a rotating arbitration system that is "fair". Each radio runs the same algorithm to determine which has access, and the "winner" has exclusive rights to transmit data during that transmit opportunity, while all other radios receive.

Link Scheduler

The MAC method requires each radio to transmit energy at the proper time such that it will be received at the pre-scheduled time. This requires not only the stability of CSAC 15, but also accurate estimates of the propagation delay of the channel and the worst-case drift between the transmitter and receiver clocks.

Link scheduler 11b receives data from the link manager 11a, clock drift estimator 11c, and channel estimator 11d. From this data, link scheduler 11b calculates transmit times, based on the base transmit times provided by the above-described channel plan. It also determines its own receiver time windows, so that its receiver is awake listening for energy. Its decisions are based on parameter estimates including propagation delay and worst-case clock drift between the two clocks.

More specifically, link scheduler 11b calculates the times at which energy should be transmitted so that it is received as near as possible to the pre-scheduled time. The time at which energy should be transmitted by a radio to another radio so that the energy will arrive at the time that the receiver expects it is expressed as:

$$TT_n = T_n - \text{propagation}(i,j,t) \quad (2),$$

where propagation(i,j,t) is an estimate of the time it takes the energy to propagate between the sending radio (i) and receiving radio (j) (at the speed of light). This delay varies over time as the radios move.

A receiving radio 10 knows the time that energy should be received at time Tn, but because radio clocks are drifting, and are potentially moving with respect to each other, the receiving radio 10 must wake up and begin listening for energy at the earliest time that energy could arrive, which is dependent upon the worst case of the error between the clocks of radios i and j at time t, as well as the worst case of the error in the propagation delay estimate used by the transmitter (see Equation (2) above).

$$TR_n >= T_n - \text{drift}(i,j,t) - \text{propagation error}(i,j,t) \quad (3)$$

Drift(i, j, t) is the current worst case time drift between clocks i and j at time t. Propagation-error(i,j,t) is the time required for light to have travelled the distance at which the distance in the radios could have increased between transit opportunities. Propagation-error is related to the maximum speed of the radios and the delay between propagation time estimates. For expedience, this value is set to a configurable constant time since the last transmission between radios i and j.

Clock Drift and Channel Estimators

The link scheduler 11b described above requires accurate estimates of both the propagation delay between radios and the worst case drift between their clocks. If the clock drift is larger, then the receiving radio 10 must wake up earlier to wait for the energy. The smaller the clock drift, the later the receiver can be woken up to begin listening for energy. However, if the estimate is inaccurate (less than the actual), the scheme fails and the information will be missed. Thus, the goal is to have accurate estimates of the clock drift, and also the propagation delay to maximize the benefit of the scheme.

A clock drift estimator 11c receives data from a stored model 11e of the clock drift for CSACs 15. Models have been developed using a large number of experiments on CSACs, which account for the properties of specific sets of clocks. Through these experiments, the worst case clock drift between any two CSACs can be modeled by a linear function of time, beginning at zero (when the clocks are disciplined together), and proceeding at a constant drift per unit time during the mission. Just after disciplining, CSACs have the same clock, for practical purposes. They then begin to drift, and the worst case difference in the clocks increases over time as the mission progresses.

The worst-case drift between two clocks, i and j, may be modeled by:

$$\text{drift}(i,j,t) <= C_{i,j} * t \quad (4),$$

where $C_{i,j}$ is the maximum drift rate between the clocks of radios i and j, which has been determined to be relatively independent of temperature or other environmental conditions to be less than 16 µs/12 hours. For the most accurate results, $C_{i,j}$ may be characterized for specific clocks, and provided as a configuration parameter stored by parameter estimator 11c.

The channel estimator 11d estimates propagation delay between each combination of radios 10 by periodically exchanging time stamps between radios. During a pre-selected sequence of transmit opportunities, Radio i and Radio j send timestamps back and forth. The time at which the timestamp is received is noted. After the round-trip, the channel propagation delay is estimated as follows.

Radio i samples Clock i, and sends the timestamp value to Radio j. Radio j samples Clock j exactly when energy is received. Then during the next transmit opportunity, Radio j sends a timestamp back to Radio i in the same way.

Assume $t_{t1}$ is the time at which Radio i transmitted the first timestamp value (in terms of Clock i), and $t_{r1}$ is the time at which Radio j received the first timestamp value (in terms of Clock j). Likewise, $t_{t2}$ is the time at which Radio j transmitted the second (return) timestamp value (in terms of Clock j), and $t_{r2}$ is the time at which Radio i received the second (return) timestamp value (in terms of Clock i). In each of these cases, the time is an estimate of the actual time, and the error of that estimate depends upon the drift of the clock in which the timestamp is taken.

Assuming that the propagation time is the same in both directions (the radios have not moved very much between the timestamps, and the channel is relatively symmetric), and that the drift of each individual clock during the exchange processes is negligible, the following is true:

propagation (i,j,t) is estimated by $$(t_{r1} - t_{t1} + t_{t2} - t_{r2})/2 \quad (5)$$

This estimate is accurate due to the fact that the errors due to drift for each clock are effectively subtracted out.

MAC method with Pre-determined Channel Plan

Figure 2:
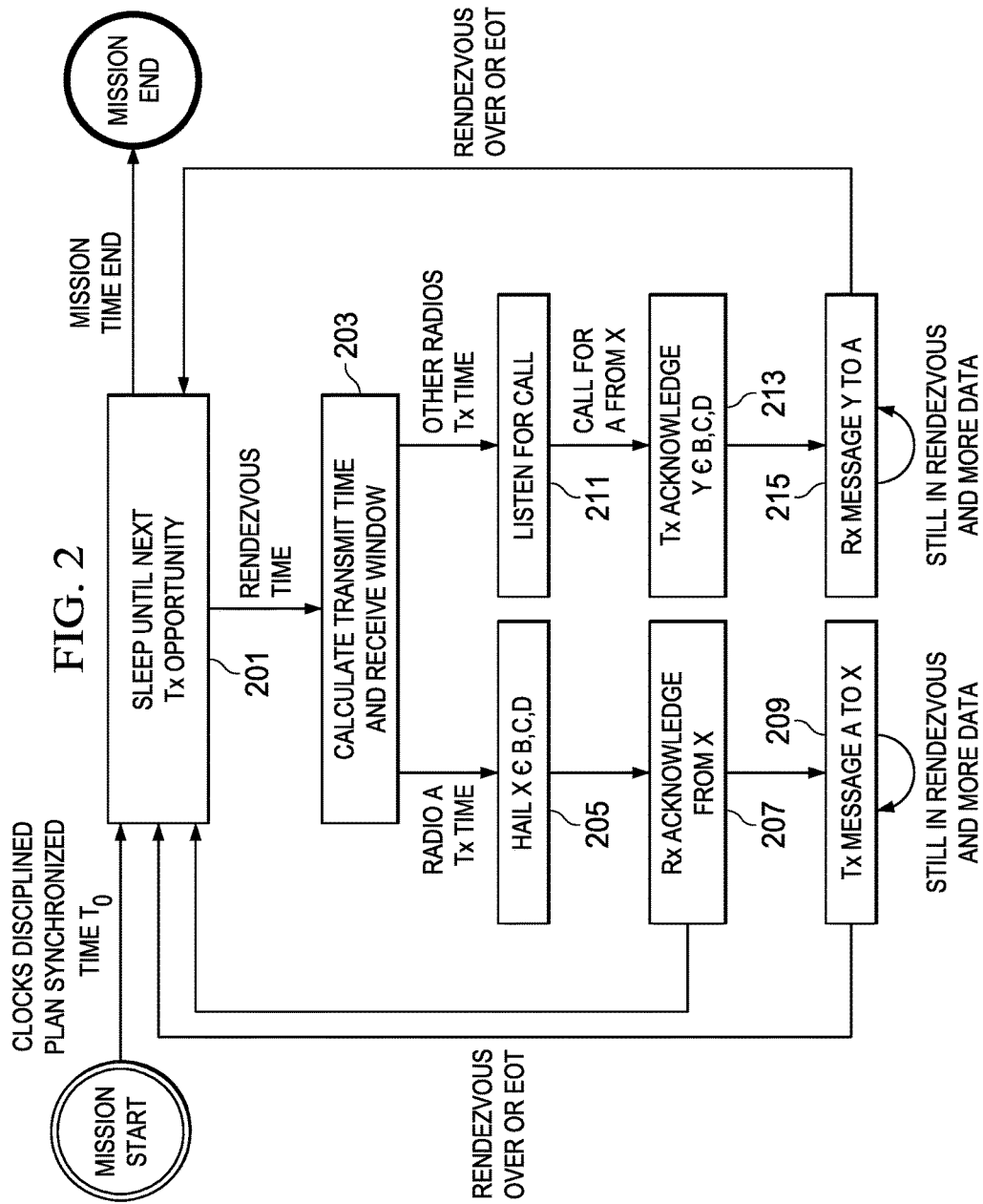
FIG. 2 illustrates a method of synchronizing communications among radios having MAC units like that of FIG. 1.

FIG. 2 illustrates how the above-described method is implemented in a network of radios. The radios are identified as Radios A, B, C, D . . . , with the method being shown from the perspective of Radio A. The other radios in the network perform in the same manner as Radio A.

The method is performed by the various processes of a MAC unit 11 of Radio A, described above in connection with FIG. 1. The method of FIG. 2 is the above-described "dynamic" scheme, which includes hail messages and arbitration, but other schemes that do not provide arbitration are also possible.

As described above, for a given mission, each radio is provided with a pre-determined "channel plan", which defines a set of transmission opportunities. The transmission opportunities provided by the channel plan are referred to herein as "base" transmission times, or $T_n$, calculated from a shared seed and random time delay generator as described above.

At the beginning of the mission, the clocks of all radios are synchronized to time $T_0$. This initial synchronization may be achieved with various external synchronization schemes, such as by a GPS signal. A feature of the method is that although the clocks may be externally synchronized, a given mission of indeterminate length may take place without such external synchronization.

In Step 201, Radio A sleeps until the next pre-determined transmit opportunity. This means that the electronics associated with transmitting and receiving messages are turned off. Radio A and each other radio in the network remains in sleep mode unless directed by the link controller 11b to transmit or listen for a message.

In Step 203, a transmit opportunity has occurred, and has been presented to the link scheduler 11b. As described above, link scheduler 11b uses a clock drift estimate and a propagation delay estimate to calculate both an actual transmit time, as well as a receive time window during which its receiver will be awake (turned on) and ready to receive messages. The clock drift estimates and propagation delay estimates are continuously updated so that current values of these estimates are used to determine transmit times and receive windows.

Steps 205 applies if Radio A has a message to send. In Step 205, at the actual transmit time, Radio A transmits a "hail" signal to the intended recipient, Radio X. In Step 207, Radio X has transmitted an acknowledgment signal to Radio A. In Step 209, Radio A transmits the message to Radio X. If no acknowledgement was received, or when the message transmission ends, Radio A returns to its sleep mode, Step 201.

Step 211 occurs during the receive time window. Radio A listens for a hail call from any other radio in the network. Step 213 is performed if Radio A receives a hail call, here from Radio Y. In response, Radio A delivers an acknowledgment signal to Radio Y. This prompts Radio Y to transmit the message, which Radio A receives in Step 215. After that message transmission ends, Radio A returns to sleep mode, Step 201.

As described above, the pre-determined schedule of transmit opportunities reduces the SWaP for each radio. The timing of transmission and receipt further decreases the energy necessary for communication and decreases the possibility of interception and detection. In scenarios in which power consumption or detection are prime concerns, the above-described method alleviates complexity and allows the radios to be reduced in size and power.

What is claimed is:

1. A method of synchronizing the transmission and receipt of messages by radios within a wireless communications network, each radio having a chip scale atomic clock, comprising:
   placing each radio in sleep mode, such that its receive and transmit circuitry is inactive, and such that each radio remains in sleep mode unless that radio is directed to transmit or listen for a message;
   storing a channel plan in memory of each radio, the channel plan representing a set of pre-determined base transmit times, which are used to determine transmit opportunities in lieu of a timing signal;
   wherein the channel plan is based on a shared algorithm that provides a transmit pattern with random delays between transmit opportunities, such that the start of each transmission opportunity is determined by a shared seed and a random time delay generator;
   continuously estimating worst case time drift values between clocks within the network;
   continuously estimating propagation delay values between each combination of radios;
   beginning at each base transmit time, performing the following steps by each radio: if a radio has an outgoing message to transmit to a receiving radio, subtracting a value representing a current propagation delay to the receiving radio from the base transmit time, thereby determining an actual transmit time; at the actual transmit time, removing the transmitting circuitry from sleep mode and delivering the outgoing message; returning to sleep mode after the outgoing message is transmitted; subtracting a current time drift value from the base transmit time, thereby determining a receive time window; during each receive time window, removing the receiving circuitry from sleep mode and receiving an incoming message from the other radio; and returning to sleep mode after the incoming message is received;
   wherein any radio is capable of receiving an incoming message at the same time in response to the same base transmit time.

2. The method of claim 1, wherein the step of delivering the outgoing message is preceded by delivering a hail message and receiving an acknowledgment message.

3. The method of claim 1, wherein the step of receiving the incoming message is preceded by acknowledging a hail message from another radio.

4. The method of claim 1, in which each base transmit time is associated with a particular radio.

5. The method of claim 1, wherein the base transmit times are calculated from a shared seed and random time delay generator.

6. The method of claim 1, wherein the step of subtracting a current time drift value from the base transmit time is performed by further subtracting propagation delay error.

7. The method of claim 1, wherein the step of estimating propagation delay values is performed by exchanging time stamps.

8. The method of claim 7, wherein each propagation delay value is estimated by $(tt1-tr1+tt2-tr2)/2$, where tti is the time at which Radio i transmitted the first timestamp value (in terms of Clock i), tr1 is the time at which Radio j received the first timestamp value (in terms of Clock j), tt2 is the time at which Radio j transmitted the second (return) timestamp value (in terms of Clock j), and tr2 is the time at which Radio i received the second (return) timestamp value (in terms of Clock i).

9. A media access control system for synchronizing the transmission and receipt of messages by radios within a wireless communications network, each radio having at least a host system, a chip scale atomic clock and a physical interface for sending and receiving messages, the system comprising:
   a link manager programmed to store channel plan data representing a set of pre-determined base transmit times, which are used to determine transmit opportunities in lieu of a timing signal, and wherein the channel plan is based on a shared algorithm that provides a transmit pattern with random delays between transmit opportunities, such that the start of each transmission opportunity is determined by a shared seed and a random time delay generator;
   a clock drift estimator programmed to continuously estimate time drift values between clocks within the network;

a channel estimator programmed to continuously estimate propagation delay values between each combination of radios;

a link scheduler programmed to place the physical interface of each radio in sleep mode, such that its receiving and transmission circuitry is inactive, and such that each radio remains in sleep mode unless that radio is directed to transmit or listen for a message, and such that any radio is capable of receiving an incoming message at the same time in response to the same base transmit time;

wherein the link scheduler is further operable to perform the following tasks beginning at each base transmit time: if a radio has an outgoing message to transmit to a receiving radio, subtracting a current propagation delay value representing propagation delay to the receiving radio from the base transmit time, thereby determining an actual transmit time; at the actual transmit time, removing the transmit circuitry from sleep mode and delivering the outgoing message; returning to sleep mode after the outgoing message is transmitted; subtracting a current time value from the base transmit time, thereby determining a receive time window; during each receive time window, removing the receiving circuitry from sleep mode and receiving an incoming message from the other radio; returning to sleep mode after the incoming message is received.

10. The system of claim 9, wherein the step of delivering the outgoing message is preceded by delivering a hail message and receiving an acknowledgment message.

11. The system of claim 9, wherein the step of receiving the incoming message is preceded by acknowledging a hail message from another radio.

12. The system of claim 9, in which each base transmit time is associated with a particular radio.

13. The system of claim 9, wherein the base transmit times are calculated from a shared seed and random time delay generator.

14. The system of claim 9, wherein the step of subtracting a current time drift value from the base transmit time is performed by further subtracting propagation delay error.

15. The system of claim 9, wherein the step of estimating propagation delay values is performed by exchanging time stamps.

16. The system of claim 15, wherein each propagation delay value is estimated by $(tt1-tr1+tt2-tr2)/2$, where $tt1$ is the time at which Radio i transmitted the first timestamp value (in terms of Clock i), $tr1$ is the time at which Radio j received the first timestamp value (in terms of Clock j), $tt2$ is the time at which Radio j transmitted the second (return) timestamp value (in terms of Clock j), and $tr2$ is the time at which Radio i received the second (return) timestamp value (in terms of Clock i).

* * * * *